(12) United States Patent
Jüngling et al.

(10) Patent No.: US 6,262,213 B1
(45) Date of Patent: Jul. 17, 2001

(54) ANIONIC POLYMERIZATION OF ACRYLATES AND METHACRYLATES

(75) Inventors: Stephan Jüngling, Mannheim; Hermann Gausepohl, Mutterstadt; Volker Warzelhan, Weisenheim; Graham Edmund Mc Kee, Neustadt; Michael Fischer, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/319,598

(22) PCT Filed: Dec. 1, 1997

(86) PCT No.: PCT/EP97/06711

§ 371 Date: Jun. 8, 1999

§ 102(e) Date: Jun. 8, 1999

(87) PCT Pub. No.: WO98/25975

PCT Pub. Date: Jun. 18, 1998

(30) Foreign Application Priority Data

Dec. 10, 1996 (DE) .............................. 196 51 299

(51) Int. Cl.$^7$ .................................. C08F 120/10
(52) U.S. Cl. .............. 526/328; 526/89; 526/90; 526/123.1; 526/170; 526/319; 526/326; 526/328.5; 526/329.7

(58) Field of Search ................... 526/319, 326, 526/328, 328.5, 329.7, 89, 90, 123.1, 170

(56) References Cited

U.S. PATENT DOCUMENTS

| 5,548,043 | * | 8/1996 | Saban et al. ............... 526/84 |
| 5,677,387 | | 10/1997 | Bayard et al. . |
| 5,686,534 | | 11/1997 | Bayard et al. . |

FOREIGN PATENT DOCUMENTS 71 11440    11/1972 (FR) .

OTHER PUBLICATIONS

J.M. Rev. Macromol. Chem. Phys., 1994, C34(2)243–324, 1994.
JP Abst. 2258–808.
JP Abst. 06306112.
JP Abst. 06093049.

\* cited by examiner

*Primary Examiner*—Helen L. Pezzuto
(74) *Attorney, Agent, or Firm*—Keil & Weinkauf

(57) ABSTRACT

Anionic polymerization is used for the preparation of reaction mixtures comprising homopolymers, copolymers or block copolymers, and of homopolymers, copolymers and block copolymers which comprise acrylates or methacrylates or acrylates and methacrylates, wherein olefinically unsaturated compounds which are not acrylate or methacrylate derivatives are employed as solvent or as solvent component.

16 Claims, No Drawings

ANIONIC POLYMERIZATION OF ACRYLATES AND METHACRYLATES

The present invention relates to a process for preparing homopolymers, copolymers-or block copolymers which comprise acrylates or methacrylates, by anionic polymerization, and to the use of the resultant reaction mixtures for free-radical polymerization.

Processes for preparing polymers from acrylates and methacrylates by anionic polymerization have been known for a long time. A review is given, for example, in J.M.S.-Rev. Macromol. Chem. Phys., 1994, C34, pp. 243–324.

Examples of proven effective initiators for anionic polymerization are systems based on organolithium compounds, alkoxyalkoxides and lanthanoid metallocene compounds. EP-A 0 524 054 describes the polymerization of, for example, 2-ethylhexyl acrylate in the presence of diphenylmethyllithium as initiator and $CH_3(OCH_2CH_2)_2OLi$ as additive. JP-A 2258808, JP-A 6306112 and JP-A 6093049 describe the polymerization of acrylates and methacrylates using lanthanoid metallocenes, such as $(C_5Me_5)_2Sm(THF)_2$.

All known anionic polymerization processes are dependent on the use of an inert solvent, inter alia to prevent premature chain termination. Tetrahydrofuran (THF), toluene, ethylbenzene or any desired mixture of these components very frequently form a suitable reaction medium for anionic polymerization. A disadvantage in the use of the latter solvents, in particular in samarocene-initiated anionic polymerization, is the pronounced gel formation which occurs primarily at the end of the polymerization and which hinders straightforward work-up and therefore also scaling up an industrial process. In addition, this phenomenon frequently leads to broad molecular weight distributions and incomplete monomer conversion.

It is an object of the present invention to develop a reaction medium for anionic polymerization, which medium does not have the disadvantages mentioned and furthermore gives reproducibly good polymerization results independently of the initiator system and the size of the batch which are used.

We have found that this object is achieved by means of a process for preparing reaction mixtures comprising homopolymers, copolymers or block copolymers, and of homopolymers, copolymers and block copolymers, which comprise acrylates or methacrylates or acrylates and methacrylates, by anionic polymerization, in which olefinically unsaturated compounds which are not acrylate derivatives or methacrylate derivatives are employed as solvent or as solvent components. In a preferred embodiment, vinylaromatic compounds are employed as solvent or solvent component.

In principle, suitable unsaturated olefinic compounds are those which are described by the formula (I):

$(R^a)(R^b)C=C'(R^c)(R^d)$ (I), where:

$R^a$, $R^b$, independently of one another, are hydrogen, unsubstituted or substituted, straight-chain or branched, $C_1$–$C_{14}$-alkyl such as methyl, ethyl, isopropyl, n-propyl, isobutyl, n-butyl, tert-butyl, unsubstituted or singly- or multiply substituted $C_6$–$C_{14}$-aryl, such as phenyl or tolyl, unsubstituted or substituted $C_3$–$C_7$-cycloalkyl, such as cyclopropyl, cyclopentyl or cyclohexyl, $C_2$–$C_{10}$-alkenyl, such as vinyl, allyl, butenyl or butadienyl, and $R^c$, $R^d$, independently of one another, are hydrogen, unsubstituted or substituted, straight-chain or branched, $C_1$–$C_{14}$-alkyl such as methyl, ethyl, isopropyl, n-propyl, isobutyl, n-butyl, tert-butyl, unsubstituted or singly- or multiply substituted $C_6$–$C_{14}$-aryl, such as phenyl or tolyl, unsubstituted or substituted $C_3$–$C_7$-cycloalkyl, such as cyclopropyl, cyclopentyl or cyclohexyl, $C_2$–$C_{10}$-alkenyl, such as vinyl, allyl, butenyl or butadienyl, or, together with C', are unsubstituted or singly- or multiply-substituted cyclopropyl, cyclopentyl or cyclohexyl.

Examples of suitable olefinically unsaturated compounds are ethylene, propylene, 1-butene, 2-butene, butadiene, 1,4-hexadien, 1,5-hexadiene and 1-octene. The radicals $R^a$, $R^b$ and/or $R^c$, $R^d$ and the radicals $R^a$, $R^c$ and/or $R^b$, $R^d$ can respectively form an unsaturated carbocycle or heterocycle, such as cyclopentene, cyclohexene, cyclopropylidene, cyclopentylidene or fulvene.

Examples of vinylaromatic compounds particularly suitable as solvents or solvent components for the novel process are styrene, α-methylstyrene, o-, m- and p-methylstyrene and any desired mixtures of the abovementioned vinylaromatic compounds. Styrene, and also butadiene and ethene, are preferably used as solvent or as solvent component, styrene being particularly preferred. If vinylaromatic compounds and/or the unsaturated compounds as claimed in claim 1 form a component of a solvent system, then the proportion of this component, based on the total amount of solvent, is preferably in the range from 5 to 99% by volume.

In addition, tetrahydrofuran, diethyl ether, dimethoxyethane, toluene, ethylbenzene, cyclohexane or any desired mixture of the abovementioned solvents may be employed, for example, as further solvent constituents. Suitable solvent systems are, for example, styrene/tetrahydrofuran, styrene/toluene and styrene/tetrahydrofuran/ethylbenzene.

In principle, however, any inert, aprotic, polar or nonpolar solvent is suitable as further solvent component.

Using the novel process, it is possible to obtain either homopolymers or copolymers or block copolymers from vinyl monomers having polar groups. Homopolymers, copolymers and block copolymers containing acrylates or methacrylates are preferably prepared. It is possible, for example, to prepare copolymers consisting of acrylates or methacrylates or of a mixture of acrylates and methacrylates. Furthermore, both two-block and multiblock copolymers consisting of acrylates and/or methacrylates are obtainable, for example n-butyl acrylate-2-ethylhexyl acrylate or methyl methacrylate-2-ethylhexyl acrylate block copolymers. For the purposes of the invention, homopolymers, copolymers and block go copolymers are not only the isolated polymers, but also the reaction mixtures obtained using anionic polymerization and comprising homopolymers, copolymers or block copolymers.

Examples of suitable acrylate monomer building blocks are $C_1$–$C_{20}$-alkyl acrylates, $C_1$–$C_{10}$-alkyl acrylates being preferred and $C_1$–$C_8$-alkyl acrylates being particularly preferred. The alkyl radicals may be either linear or branched or form a ring or contain ether groups or amino groups and be partially or completely substituted with halogen. Examples of compounds which may be employed are 2-ethylhexyl acrylate, 2-ethylpentyl acrylate, 2-ethylbutyl acrylate, 2-methylhexyl acrylate, 2-methylpentyl acrylate, 2-methylbutyl acrylate, 2-methylpropyl acrylate, 3-ethylhexyl acrylate, 3-ethylpentyl acrylate, 3-methylhexyl acrylate, 3-methylpentyl acrylate, 3-methylbutyl acrylate, methyl acrylate, ethyl acrylate, n-propyl acrylate, isopropyl acrylate, n-butyl acrylate, isobutyl acrylate, tert-butyl acrylate, n-pentyl acrylate, isopentyl acrylate, n-hexyl acrylate, n-decyl acrylate, 4-tert-butylcyclohexyl acrylate, stearyl acrylate, lauryl acrylate, ethyl diglycol acrylate, 2-ethoxyethyl acrylate, 2-methoxyethyl acrylate and dimethylaminoethyl acrylate. Other suitable acrylates are those having an olefinically unsaturated ester moiety, such as dihydrodicyclopentadienyl acrylate, allyl acrylate, 3- or 4-vinylbenzyl acrylate and 2-allyloxyethyl acrylate, and those with aromatic groups,-such as phenyl acrylate and 2-phenoxyethyl acrylate, or vinylaromatic groups. Preference is given to methyl acrylate, n-butyl acrylate, 2-ethylhexyl acrylate, dihydrodicyclopentadienyl acrylate and allyl acrylate, in particular 2-ethylhexyl acrylate.

Examples of suitable methacrylate monomer building blocks are alkyl methacrylates having from 1 to 20 carbon atoms, preferably from 1 to 10 and in particular from 1 to 8 carbon atoms, in the ester group. The alkyl radials may be either linear or branched or form a ring, and may be partially or completely substituted with halogen, or may contain ether or amino groups. Examples of groups which may be used are 2-ethylhexyl methacrylate, 2-ethylpentyl methacrylate, 2-ethylbutyl methacrylate, 2-methylhexyl methacrylate, 2-methylpentyl methacrylate, 2-methylbutyl methacrylate, 2-methylpropyl methacrylate, 2-ethylhexyl methacrylate, 3-ethylpentyl methacrylate, 3-methylhexyl methacrylate, 3-methylpentyl methacrylate, 3-methylbutyl methacrylate, methyl methacrylate, ethyl methacrylate, 2,2,2-trifluoroethyl methacrylate, n-propyl methacrylate, isopropyl methacrylate, n-butyl methacrylate, isobutyl methacrylate, tert-butyl methacrylate, n-pentyl methacrylate, isopentyl methacrylate, n-hexyl methacrylate, cyclohexyl methacrylate, n-octyl methacrylate, n-decyl methacrylate and glycidyl methacrylate. Methacrylates having an olefinically unsaturated ester unit may likewise be employed, examples being dihydrodicyclopentadienyl methacrylate, allyl methacrylate, 3- or 4-vinylbenzyl methacrylate and 2-allyloxyethyl methacrylate, as may also those having aromatic ester radicals, such as phenyl or 2-phenoxyethyl, or having vinylaromtatic ester radicals. Methyl methacrylate, 2-ethylhexyl methacrylate and allyl methacrylate are preferred.

Each of the abovementioned acrylates and methacrylates may be used by itself to prepare homopolymers or may be used in any desired formulation to prepare copolymers and block copolymers.

Besides these, other monomer building units for preparing copolymers and block copolymers containing acrylates and/or methacrylates are acrylonitrile, methacrylonitrile, acrylamides and methacrylamides.

Preferred random copolymers are those which are built up from 2-ethylhexyl acrylate and methyl methacrylate, n-butyl acrylate, tert-butyl acrylate, dihydrodicyclopentadienyl acrylate, 3- or 4-vinylbenzyl acrylate, 2-allyloxyethyl acrylate or allyl acrylate, in particular from 2-ethylhexyl acrylate and n-butyl acrylate.

Preferred block copolymers are those built up from 2-ethylhexyl acrylate and methyl methacrylate, n-butyl acrylate, tert-butyl acrylate, dihydrodicyclopentadienyl acrylate, 3- or 4-vinylbenzyl methacrylate, 2-allyloxyethyl methacrylate or allyl acrylate, in particular from 2-ethylhexyl acrylate and methyl methacrylate.

The novel process can be carried out with initiator systems known for anionic polymerization, as described in J.M.S.-Rev. Macromol. Chem. Phys., 1994, C34, pp. 243–324.

An initiator system which, inter alia, has proven suitable, consists of, as initiator, an organometallic compound, preferably of an alkali metal, or a mixture of different organo-metallic compounds, and a metal alkoxide, in particular an alkali metal alkoxide, as chelating additive. An initiator formulation of this type is found in EP-A 0 524 054, with diphenylmethyllithium named as preferred starter and the lithium salt of $CH_3(OCH_2CH_2)_2OH$ as additive, and likewise in EP 0 668 297, in which, besides the abovementioned initiator system, bimetallic alkoxyalkoxides are highlighted.

Examples of chelating additives are $CH_3(OCH_2CH_2)OLi$, $CH_3(OCH_2CH_2)_2OLi$, $CH_3(OCH_2CH_2)_3OLi$, n-Bu $(OCH_2CH_2)_2OLi$ and $Et(OCH_2CH_2)_2OLi$ or mixtures of these. In addition, suitable uncharged chelating additives are macrocyclic polyethers and cryptands, such as benzo-15-crown-5, benzo-18-crown-6, 1,4,7,10-tetraoxacyclododecane, 1,4,7,10,13-pentaoxacyclooctadecane, 2,3,11,12-dibenzo-1,4,7,10,13,16-hexaoxacyclooctadecan-2,11-diene, 1,10-diaza-4,7,13,16,21,24-hexaoxabicyclo[8.8.8]hexacosane or 5,6-benzo-4,7,13,16,21,24-hexaoxa-1,10-diazabicyclo[8.8.8]hexacosane.

A further, likewise preferred, anionic initiator system for the novel process is based on (a) metal alkoxides of the formula (i) or (ii) as chelating additives $$R^1R^2N\text{—}R^3\text{—}OM \quad (i),$$

where each of $R^1$ and $R^2$, independently of one another, and $R^4$ may be the alkyl group methyl, ethyl, isopropyl, n-propyl, isobutyl, n-butyl or tert-butyl; the cycloalkyl group cyclopropyl, cyclopentyl or cyclohexyl; the alkylaryl group benzyl; the aromatic group phenyl; or the heteroaromatic group pyridyl, $R^3$ is, for example, methylene, ethylene, n-propylene, isopropylene, ethoxyethyl or phenylene, $R^5$ and $R^6$, independently of one another, may be the aryl group phenyl; the alkylaryl group benzyl; the alkyl group methyl, ethyl, isopropyl, n-propyl, isobutyl, n-butyl or tert-butyl and M, $Z^1$ and $Z^2$, independently of one another, are metal cations selected from the group consisting of the alkali metals, in particular lithium, and (b) alkali metal alkyl compounds or alkaline earth metal alkyl compounds as initiator.

Examples of the alkali metal alkoxides of the formulae (i) and (ii) are the lithium salts of 2-dimethylaminoethanol, 2-diethylaminoethanol, 2-diisopropylaminoethanol, 1-(dimethylamino)-2-propanol, 2-dibutylaminoethanol, 2,2'-(n-butylimino)bisethanol, 1,1'-(methylimino)bis-2-propanol, 2-[2-(dimethylamino)ethoxy]ethanol, 2-diphenylaminoethanol, 2-(ethylphenylamino)ethanol, 2-[ethyl-(3-methylphenyl)amino]ethanol, 3-(ethylamino)-4-methylphenol, 3-diethylaminophenol, 2,2'-(phenylimino)bisethanol and 2,2'-[(3-methylphenyl)imino]bisethanol. Preference is given to the lithium salts of 2-dimethylaminoethanol, 2-diethylaminoethanol, 2-diisopropylaminoethanol, 2-diethylaminoethanol, 2-diisopropylaminoethanol, 1,1'-(methylimino)bis-2-propanol and 2-[2-(dimethylamino)ethoxy]ethanol. Particular preference is given to the lithium salts of 2-dimethylaminoethanol and 1,1'-(methylimino)bis-2-propanol. The alkali metal alkoxides can be obtained by well known processes from the corresponding aminoalcohols by treatment with bases. For example, lithium 2-dimethylaminoethoxide is prepared by deprotonizing 2-dimethylaminoethanol at 0° C. using sec-butyllithium.

The anionic metal alkyl initiator compounds for the novel process can generally be alkali metal alkyl or alkali metal alkylaryl compounds, the alkyl radical preferably having from 1 to 10, particularly preferably from 1 to 6 carbon atoms. The alkylaryl compounds preferably have a $C_1$–$C_{10}$-alkyl group and a $C_6$–$C_{14}$-aryl group, a particularly preferred aryl radical being phenyl or substituted phenyl. Suitable alkylaryl compounds are alkali metal compounds derived, for example, from styrene, α-methylstyrene or 1,1-biphenylethene, obtained by reaction with, for example, n-butyllithium, sec-butyllithium or tert-butyllithium. Examples of frequently used alkylaryl compounds and alkali metal alkyl compounds are: n-butyllithium, sec-butyllithium, tert-butyllithium, diphenylmethyllithium, diphenylmethylsodium, diphenylmethylpotassium, 1-phenylhexyllithium and 1,1-diphenylhexyllithium.

Anionic initiator compounds additionally employed can be alkali metal amides, alkali metal ester enolates or alkali metal ketoenolates. Among these, the following are preferred: lithium diisopropylamide, lithium ethylisobutyrate and also the lithium enolate of diisopropyl ketone.

In the novel process based on initiator systems with anionic initiator compounds, preference is given to the use of one or more solvent components in addition to styrene as solvent.

The further components are preferably inert non-polar and polar solvents. Examples of these are aromatic hydrocarbons, such as toluene, benzene, xylene and ethylbenzene, and aliphatic hydrocarbons, such as cyclohexane, hexane, pentane and tetrahydrofuran. Mixtures of non-polar solvent components, such as mixtures of toluene with ethylbenzene, and mixtures of non-polar and polar solvents, such as mixtures of ethylbenzene and tetrahydrofuran, may also be used as solvent component.

Generally, for example, the styrene proportion of the total amount of solvent is in the range from 10 to 100% by volume, preferably in the range from 20 to 99% by volume and particularly preferably in the range from 30 to 95% by volume, if the anionic polymerization is initiated with alkali metal alkyl compounds or alkaline earth metal alkyl compounds.

The solvent component used in addition to the vinylaromatic compound preferably consists of non-polar solvents or of solvent mixtures consisting essentially of non-polar and, with these, polar constituents. Far example, a mixture of ethylbenzene and tetrahydrofuran with a mixing ratio in the range from 55:45 to 99:1, preferably from 80:20 to 95:5, may be employed as solvent component.

The novel processes in the presence of an anionic initiator can be employed either as batch processes or as continuous processes. In principle, the components of the initiator formulation, the solvent and the monomers can be mixed with one another in varying sequences. For example all of the initiator components can be precharged, followed by addition of solvent(s) and monomer(s). The components of the initiator system can, moreover, be added to the monomer solution either in separate solutions, simultaneously or in succession, the organometallic compound generally being precharged, or as a mixture prepared in an inert solvent or solvent system. The monomer solution is preferably added to the initiator system. In the batch process, the amount of monomer(s) may be added all at once, in portions or continuously.

Especially in the continuous mode of operation, it has proven advantageous to feed the initiator system and the monomer solution simultaneously or virtually simultaneously, if desired under turbulent mixing conditions, into the reaction vessel. For this, the monomer solution and the initiator solution are mixed in a mixing nozzle of low volume under turbulent flow conditions and then fed through a tube with a narrow cross-section, which may be equipped with static mixers (e.g. Sulzer SMX-Mixer). The rate of flow should be sufficiently high for a relatively uniform residence time to be observed. A second monomer can be added in a further, downstream mixing nozzle.

The reaction can be carried out, for example, in the range from −78° C. to +100° C., the range from −55° C. to +80° C. being preferred. The reaction temperature can either be held constant or increased in a controlled manner. In order to achieve high molecular weights $M_n$ and narrow molecular weight distributions, it is not harmful if the reaction mixture becomes warm within a short period of time as a result of the enthalpy of reaction which is liberated.

After the molecular weight has been built up, the polymerization reaction is terminated by adding a protic substance, such as an alcohol (e.g. methanol, ethanol or isopropanol), an acid (e.g. acetic acid, formic acid or hydrochloric acid), water or a mixture of these.

The reaction mixture can be worked up in a manner known per se. The resulting polymers can, for example, be precipitated by adding a suitable amount of a low-molecular-weight alcohol or of water. If desired, the solvent or solvent system can also be removed by distillation.

The polymers obtainable by the novel process using an anionic initiator system generally have molecular weights $M_n$ in the range from 5000 to 2000000 g/mol, preferably from 5000 to 500000 g/mol, and particularly preferably from 5000 to 250000 g/mol. The molecular weight distribution $M_w/M_n$ is generally in the range from 1.05 to 3.5. Independently of the polymerization conditions and the selected amount of vinylaromatic compound, no incorporation of, for example, vinylaromatic compounds into the polymer chains is observed.

In a further preferred embodiment of the novel process, the anionic polymerization is carried out with the help of metallocene complexes. Preference is given to the use of lanthanoid-metallocene complexes, and very particular preference is given to metallocene complexes of samarium, ytterbium or europium, in particular of samarium, in which the metal formally carries a double or triple positive charge.

The metallocene complexes can have one or two metallocene ligands. Preferred metallocene ligands are, for example, $C_5$–$C_{50}$-cyclopentadienyl structural units, for example cyclopentadienyl $C_5H_5$ or any substituted or unsubstituted single-or multi-ringed molecular structure having in total from 5 to 50 carbon atoms which formally contains the cyclopentadienyl structural unit. Specific examples are cyclopentadienyl derivatives with one to five-fold substitution by $C_1$–$C_{20}$-organic or $C_1$–$C_{30}$-organosilicon radicals. These may be $C_1$–$C_{10}$-alkyl, $C_5$–$C_7$-cycloalkyl, $C_6$–$C_{15}$-aryl or aralkyl, where two neighboring radicals may also, if desired, jointly be a saturated or unsaturated cyclic group having from 4 to 15 carbon atoms, or $SiR_3$, where R is $C_1$–$C_{10}$-alkyl, $C_3$–$C_{10}$-cycloalkyl or $C_6$–$C_5$-aryl, examples being cyclopentadienyl, pentamethylcyclopentadienyl, methylcyclopentadienyl, ethylcyclopentadienyl, 4-butylcyclopentadienyl, trimethylsilylcyclopentadienyl and ethyltetramethylcyclopentadienyl.

Examples of multi-ring derivatives having a cyclopentadienyl structural unit are indenyl, fluoroenyl and benzindenyl. Preference is in principle given to cyclopentadienyl structural units which form a sterically demanding metallocene ligand, pentamethylcyclopentydienyl being particularly preferred.

Examples of metallocenes employed for the novel process are lanthanoid(II) metallocenes having two metallocene ligands, particularly preferably those lanthanoid(II) metallocenes which are complexed with two cyclopentadienyl units.

The two free coordination locations on the lanthanoid(II) metallocene having two cyclopentadienyl complex ligands are filled, for example, by weakly coordinating Lewis bases, such as tetrahydrofuran, diethyl ether, dimethoxyethane or acetonitrile, tetrahydrofuran being preferred. A suitable lanthanoid metal has proven to be samarium, which, in the preferred complexes, generally has a formal double or triple positive charge. An example of a particularly preferred metallocene initiator for the anionic polymerization, in particular of acrylates and methacrylates, is bis(pentamethylcyclopentadienyl)samarium(II)bis(tetrahydrofuran) [$(C_5Me_5)_2Sm(THF)_2$], the preparation and characterization of which can be found, for example, in W. J. Evans, I. Bloom, W. E. Hunter, J. L. Atwood, J. Am. Chem. Soc. 1981, 193, pp. 6507–6508.

Metallocene complexes with a formal triple positive charge of the formula (II) are also suitable

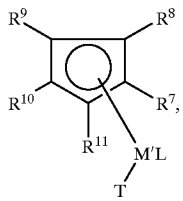

(II)

where:
is lanthanum, cerium, samarium, europium, or ytterbium,
L is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{12}$ or —$NR^{12}R^{13}$,
where
$R^{12}$ and $R^{13}$ are $C_1$–$C_{10}$-alkyl, $C_6$–$C_{15}$-aryl, alkylaryl, arylalkyl, fluoroalkyl or fluoroaryl with in each case from 1 to 10 carbon atoms in the alkyl radical and from 6 to 20 carbon atoms in the aryl radical,
$R^7$ to $R^{11}$ are hydrogen, $C_1$–$C_{10}$-alkyl, from 5-to 7-membered cycloalkyl, which may itself carry a $C_1$–$C_{10}$-alkyl as substituent, $C_6$–$C_{15}$-aryl or arylalkyl, where two adjacent radicals may also, if desired, jointly be a saturated or unsaturated cyclic group having from 4 to 15 carbon atoms, or $Si(R^{14})_3$ with
$R^{14}$ is $C_1$–$C_{10}$-alkyl, $C_3$–$C_{10}$-cycloalkyl or $C_6$–$C_{15}$-aryl,
T is L or

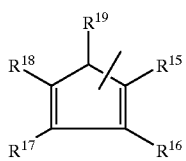

where
$R^{15}$ to $R^{19}$ are hydrogen, $C_1$–$C_{10}$-alkyl, from 5- to 7-membered cycloalkyl which may itself carry a $C_1$–$C_{10}$-alkyl as substituent, $C_6$–$C_{15}$-aryl or arylalkyl, where two adjacent radicals may also, if desired, jointly be a saturated or unsaturated cyclic group having from 4 to 15 carbon atoms, or $Si(R^{20})_3$ where
$R^{20}$ is $C_1$–$C_{10}$-alkyl, $C_6$–$C_{15}$-aryl or $C_3$–$C_{10}$-cycloalkyl.

Such complex compounds can be synthesized by methods known per se. Examples of corresponding preparation processes are described, inter alia, in the Journal of Organometallic Chemistry, 1993, 450, pp. 121–124. Mixtures of different metal complexes may also be employed.

Solvents or solvent components which may be employed in the novel process for anionic polymerization using lanthanoid metallocenes are in principle olefinically unsaturated compounds which are not acrylate derivatives or methacrylate derivatives. Examples are olefinically unsaturated compounds of the formula (I) described above.

Preference is given to the use of vinylaromatic compounds, in particular styrene, as solvent. The solvents which can be employed in the novel process may be employed by themselves or in a mixture with other inert solvents. It has, however, proven advantageous, mainly for reasons of solubility of the metallocene initiator, to use at least small amounts of a further solvent component. In principle, the abovementioned solvents and solvent systems are suitable for this. For example, tetrahydrofuran has proven suitable. The proportion of this component in the total amount of solvent is preferably in the range from 0.1 to 95% by volume, particularly preferably from 0.5 to 50% by volume, and in particular from 0.5 to 20% by volume.

In principle, the metallocene initiator, the solvent or the solvent components and the monomers may be mixed with one another in any desired sequence. For example, the metallocene initiator can be precharged, if desired in solution in a suitable solvent, e.g. tetrahydrofuran, and the solvent(s) and monomer(s) are then added.

The monomer building block(s) and the solvent or the solvent system are preferably first precharged and then mixed with a metallocene initiator solution.

The reaction can be carried out, for example, in the range from –30° C. to +80° C., the range from –20° C. to +50° C. being preferred. The reaction temperature can either be held constant or increased in a controlled manner. In order to achieve high molecular weights $M_n$ and narrow molecular weight distributions, it is not harmful if the reaction mixture becomes warm within a short period of time as a result of the enthalpy of reaction which is liberated.

It has proven advantageous to treat the monomers and the solvent which are used with suitable drying agents before the reaction, in order to remove residues of water or of the alcohol components and carboxylic acid components of the (meth)acrylates employed. Alumina beads may be employed, for example, for this purpose. It has also proven advantageous, especially for the achievement of reproducibly high molecular weights $M_n$, to add organoaluminum compounds or organoboron compounds to the reaction mixture, as described, for example, in U.S. Pat. No. 4,889,900 or U.S. Pat. No. 5 002,676. For this purpose, solutions of organoaluminum compounds in inert solvents, such as toluene or hexane, are preferably used. Suitable organoaluminum compounds are, for example, trialkyl- and triarylaluminum compounds, and organoaluminum compounds with alkyl and aryl radicals or hydride radicals, e.g. diisobutylaluminum hydride. Mixtures of these compounds are likewise suitable. Preference is given to trialkylaluminum compounds, in particular triethylaluminum and triisobutylaluminum. However, in principle, easily hydrolyzable compounds which do not undergo any reaction with the monomer building blocks or the solvents are suitable. These are added to the monomer components and solvent components before the metallocene initiator is added.

After the molecular weight has been built on, the polymerization can be terminated, as described above for anionic initiator systems, by adding a protic substance. Mixtures of methanol and acetic acid, e.g. in a ratio in the range from 100:1 to 1:100, preferably from 10:1 to 1:10, have proven especially suitable.

The polymers obtained using metallocene initiator are generally worked up as described for the anionic polymerization initiated by organometallic compounds.

After the termination of the polymerization by addition of a protic substance, but also in the absence of a discrete termination step, the reaction mixtures obtained by the novel process can immediately be subjected to a free-radical-initiated polymerization.

Distinguishing features of the novel process are firstly that complete or virtually complete conversions are achieved and secondly that the formation of gel which generally occurs, especially in anionic polymerization in ether solvents, is completely suppressed. In addition, homopolymers, copolymers and block copolymers of acrylates and/or methacrylates can be prepared in a controlled manner. Furthermore, the in-line free-radical polymerization of the reaction mixture can give, for example, acrylate- and methacrylate-containing styrene polymers and styrene copolymers in a simple manner, with a saving on the conventional solvents.

The block copolymers obtainable with the novel process can be used as blend components for preparing thermoplastic molding compositions. Preference is given to employing two- or multi-block copolymers in which at least one block has a glass transition temperature ($T_g$) below 0° C., preferably below −20° C., particularly preferably below −45° C., and at least one block has as a glass transition temperature above 30° C., preferably above 70° C., and particularly preferably above 100° C.

Examples of such two-block copolymers are poly[methyl methacrylate-b-n-butyl acrylate] and poly[methyl methacrylate-b-2-ethylhexyl acrylate]. Examples of suitable three-block copolymers are poly[methyl methacrylate-b-2-ethylhexyl acrylate-b-methyl methacrylate], poly[methyl methacrylate-b-n-butyl acrylate-b-methyl methacrylate] and poly[2-ethylhexyl acrylate-b-methyl methacrylate-b-2-ethylhexyl acrylate].

The individual blocks can, furthermore, be built up from random copolymers. An example is poly[methyl methacrylate-b-(methyl methacrylate-co-2-ethylhexyl acrylate)-b-methyl methacrylate].

The proportion in the total block copolymer of the block or blocks with a $T_g$ below 0° C. is generally in the range from 1 to 99% by weight, preferably in the range from 10 to 90% by weight, particularly preferably from 20 to 80% by weight.

To improve the mechanical properties, e.g. the impact resistance, especially at low temperature, of thermoplastic molding compositions, these block copolymers can be employed as blend components in their preparation. Such blends can be prepared, for example, with polycarbonates, polycarbonate-ASA molding compositions, e.g. Terblend® S (BASF AG), polyesters, in particular polyethylene terephthalate and polybutyleneterephthalate (Ultradure®, BASF AG), polyester-ASA-molding compositions, in particular polybutylene terephthalate-ASA molding compositions (Ultrablends® S, BASF AG), polyamides (e.g. Ultramide®, BASF AG), polyphenylene ethers, polyphenylene ether (styrene/butadiene copolymer) blend (e.g. Luranyl®, BASF AG), polyether sulfones (Ultrason® E, BASF AG), polysulfones (Ultrason® S, BASF AG), polyoxymethylenes (e.g. Ultraform®, BASF AG), polyvinyl chlorides, polyvinyl chloride-acrylate graft copolymers (e.g. Vinidur®, BASF AG), polystyrenes or impact-modified polystyrenes, as described in DE-A 29 46 761 and DE-A 17 70 392, ABS molding compositions (acrylonitrile-butadiene-styrene polymers, e.g. Terluran®, BASF AG), styrene-acrylonitrile copolymers (e.g. Lurans®, BASF AG), acrylonitrile-styrene-acrylate polymers (e.g. Luran® S, BASF AG) or polymethyl methacrylate molding compositions (e.g. Lucryl®, BASF AG) or impact-modified polymethyl methacrylate molding compositions which consist, for example, as described in EP-A 0 062 223, of a hard methyl methacrylate polymer, a hard styrene-acrylonitrile polymer and a soft graft copolymer of alkyl (meth)acrylate and, if desired, styrene on a rubber. Possible impact-modified polyalkyl methacrylate molding compositions also include those according to WO 97/08241, which are composed, for example, of a hard methyl methacrylate polymer, a hard styrene-acrylonitrile polymer and a soft graft copolymer, consisting of a first graft shell of vinylaromatic and alkyl methacrylate and a second graft shell of essentially (meth) acrylates on a rubber.

The block copolymers described form a proportion of the is thermoplastic molding composition which is usually in the range from 1 to 90% by weight, preferably from 2 to 80% by weight.

The block copolymers are generally incorporated into the molding compositions described by processes known per se, e.g. by mixing in dry, cold form, followed by melting together and thorough mixing in the extruder.

From the thermoplastic molding compositions obtained it is possible to produce films, fibers and shaped articles in a conventional manner.

EXAMPLES

The examples were carried out with exclusion of oxygen and moisture, using the conventional inert gas technique.

The number- and weight-average molecular weights $M_n$ and $M_w$ were determined using gel permeation chromatography (GPC) in tetrahydrofuran at 35° C., comparing with a narrowly distributed polymethyl methacrylate standard. A Waters 410 refractive index (RI) detector was used.

The residual monomer content in the reaction mixture was determined using gas chromatography (GC) on an HP 5890 gas chromatograph, using a capillary column, DB1 (30 μm), under the following conditions: split 1:50; injection block 250° C.; detector (FID) 250° C.; oven temperature 5 min at 60° C., then 15° C./min up to 250° C. Dioxane was employed as internal standard.

The monomeric acrylates and methacrylates were purified using flushing with nitrogen, alumina and calcium hydride, and then distilled under reduced pressure.

Ethylbenzene was purified over alumina.

Styrene was purified by passing nitrogen and storing over alumina beads.

A. Polymerizations in the Presence of an Organometallic-based Initiator System

Polymerization in a Tubular Reactor

For the delivery of initiator, additive and monomer solution, a low-pulsation, preparative HPLC pump of the type Dynamax SD1 from Rainin was used. The reaction area used was a 10 m-long metal tube cooled to −20° C. and having an internal diameter of 1.17 mm.

Example 1

Preparation of poly-2-ethylhexyl acrylate

A 1.3 M sec-butyllithium solution in cyclohexane was added at 0° C. to 1.9 g of $CH_3(OCH_2CH_2)_2OH$ (diethylene glycol monomethyl ether) and a few drops of 1,1-diphenylethylene, until a lasting red coloration appeared. Cyclohexane was removed under reduced pressure. 250 ml of tetrahydrofuran (THF) were then titrated with 0.12 ml of a 1.3 M sec-butyllithium solution (in cyclohexane) until the solution became red, and a further 2.7 ml of a 1.3 M sec-butyllithium solution were added. A dark red initiator solution was obtained.

The monomer solution of 100 ml of 2-ethylhexyl acrylate (ERA) and 300 ml of styrene (17 ml/min flow) and the initiator solution (50 ml/min flow) were fed by HPLC pumps at −50° C. to a mixing nozzle and passed through a tube of 15 m length and 1.17 mm internal diameter (mean residence time about 14 sec). The polymerization was terminated by metering-in of a methanol/acetic acid mixture (3/2, 2 ml/min flow). GC analysis gave 94% conversion; $M_n$=35500 g/mol with $M_w/M_n$=2.8.

Example 2

Preparation of poly[2-ethylhexyl acrylate-co-dihydrodicyclopentadienyl acrylate] with a content of 10% by weight of dihydrodicyclopentadienyl acrylate in a tubular reactor.

A 0.0145 molar lithium diisopropylamide solution in ethylbenzene (50 ml/min) and a 0.144 molar solution of 2-methoxylithium ethoxide in ethylbenzene (25 ml/min) were mixed with one another by means of a first mixing nozzle, cooled to −20° C. and treated, by means of a 2nd mixing nozzle, with a monomer solution in styrene, cooled to −20° C., containing 0.87 mol/l of EHA and 0.10 mol/l of dihydrodicyclopentadienyl acrylate (DCPA) (75 ml/min). The mean residence time in the tubular reactor was 4.3 sec. At the end of the tube, a 1:1 mixture of methanol and acetic acid (2 ml/min) was mixed in as a terminating reagent by means of a further nozzle. According to GC analysis, the conversion of EHA was 95% by weight and the conversion of DCPA was 96% by weight. A glass transition temperature $T_g$ of −55° C. was determined for the resultant copolymer by means of DSC analysis (heating rate: 20° C./min).

B. Polymerization in the Presence of a Metallocene-based Initiator System

Example 3

Polymerization of 2-ethylhexyl acrylate 25 ml of EHA and 2 ml of a 1 M Al(isobutyl)$_3$ solution (in toluene) were added to 100 ml of styrene. The mixture was cooled to −20° C. and immediately mixed, with vigorous stirring, with a solution of 202 mg of $(C_5Me_5)_2Sm(THF)_2$ in 5 ml of THF, whereupon the temperature increased to 24° C. After 10 min, the polymerization was terminated by adding a methanol/acetic acid mixture (1 ml; 10/1) The ERA conversion was 99%; $M_n$=130000 g/mol; $M_w/M_n$=1.47.

Example 4

Polymerization of 2-ethylhexyl acrylate 25 ml of EHA and 1 ml of a 1.9 M AlEt$_3$-solution (in toluene) were, added to 100 ml of styrene. The mixture was cooled to −20° C. and immediately mixed, with vigorous stirring, with a solution of 202 mg of $(C_5Me_5)_2Sm(THF)_2$ in 5 ml of THF. The temperature increased to 17° C. After 5 min, the polymerization was terminated by adding a methanol/acetic acid mixture (1 ml; 10/1). The EHA conversion was 93%; $m_n$=122000 g/mol; $M_w/M_n$=2.80.

Example 5

Polymerization of 2-ethylhexyl acrylate 2.25 ml of Al(iBu)$_3$ (1 M in toluene) were added dropwise at room temperature to 113 ml of 2-ethylhexyl acrylate (EHA) and the mixture obtained was transferred to 300 ml of styrene. A solution of 608 mg of $(C_5Me_5)_2Sm(THF)_2$ in 15 ml of THF was added rapidly with vigorous stirring at −20° C. A temperature rise to +39° C. was observed. After 1 h, the polymerization was terminated by the addition of 1 ml of a methanol/acetic acid mixture (10/1).

Example 6

Copolymerization of 2-ethylhexyl acrylate with allyl methacrylate (AMA)

119 ml of ERA, 5.9 ml of AMA and 10 ml of a 1 M Al(isobutyl)$_3$ solution (in toluene) were added to 500 ml of styrene in a 2 l multinecked flask with stirrer. The mixture was cooled to −20° C. and immediately mixed, with vigorous stirring, with a solution of 1 g of $(C_5Me_5)_2Sm(THF)_2$ in 20 ml of THF. The temperature increased to 21° C. After 20 min, the polymerization was terminated by adding 5 ml of a methanol/acetic acid mixture (10/1). The EHA conversion was 99.9%; $M_n$=105000 g/mol; $M_w/M_n$=1.60.

Example 7

Preparation of poly[-2-ethylhexyl acrylate-co-dihydrodicyclopentadienyl acrylate] with a content of 10% by weight of dihydrodicyclopentadienyl acrylate 2.25 ml of Al(iBu)$_3$ (1 M in toluene) were added dropwise at room temperature to 101.5 ml of ERA and 9.3 ml of dihydrodicyclopentadienyl acrylate (DCPA) in 300 ml of styrene. A solution of 595 g of $(C_5Me_5)_2Sm(THF)_2$ in 15 ml of THF was added rapidly with vigorous stirring at −20° C. A temperature rise to +35° C. was observed. After 1 h, the polymerization was terminated by addition of 1.2 ml of a methanol/acetic acid mixture (1/1) and 3.6 mg of 4-tert-butylpyrocatechol.

Analogously to Example 7, copolymers containing 2-ethylhexyl acrylate as the main monomer component and allyl methacrylate (Ex. 8) or 2-allyloxyethyl acrylate (6.6 instead of 10% by weight) (Ex. 9) as the second component were prepared.

In Example 10, differing from Example 7, the amount of dihydro-dicyclopentadienyl acrylate was selected such that 7.5% by weight were incorporated into the copolymer (see also Table 1).

Example 11

Preparation of poly[2-ethylhexyl acrylate-co-dihydrodicyclopentadienyl acrylate-co-lauryl acrylate]

2.75 ml of Al(iBu)$_3$ (1 M-in toluene) were added dropwise at room temperature to 67.6 ml of EHA, 9.3 ml of DCPA, 34.5 ml of lauryl acrylate (LA) and 300 ml of styrene. A solution of 598 mg of $(C_5Me_5)_3Sm(THF)_2$ in 15 ml of THF was added rapidly with vigorous stirring at −20° C. A temperature rise to +32° C. was observed. After 1 h, the polymerization was terminated by addition of 1.2 ml of a methanol/acetic acid mixture (1/1) and 3.6 mg of 4-tert-butylpyrocatechol.

Example 12

Block copolymerization of 2-ethylhexyl acrylate with methyl methacrylate (MMA) at −10° C.

4 ml of MMA and 2 ml of EHA, mixed dropwise with 0.03 ml of a 1.9 M AlEt$_3$ solution (in toluene), were added to 25 ml of styrene. The mixture was cooled to −10° C. and immediately mixed, with vigorous stirring, with a solution of 110 mg of (C$_5$Me$_5$)$_2$Sm(THF)$_2$ in 5 ml of THF. The temperature increased to 26° C. After 5 min, the polymerization was terminated by adding 1 ml of a methanol/acetic acid mixture (10/1).

To determine conversion, the polymer in 500 ml of methanol was precipitated with 1 ml of 2 N aqueous hydrochloric acid, filtered off and dried for 24 h in a vacuum drying cabinet at 50° C., giving 5.4 g of a white, free-flowing powder, corresponding to a yield of 100%, based on EHA and MMA. No signals of aromatic protons could be detected using $^1$H-NMR spectroscopy. M$_n$70400 g/mol; M$_w$/M$_n$=1.38.

Example 13

Preparation of poly[methyl methacrylate-b-2-ethylhexyl acrylate-b-methyl methacrylate]

2.25 ml of Al-(iBu)$_3$ (1 M in toluene) were added dropwise at room temperature to 45 ml of methyl methacrylate (MMA) and 45 ml of EHA in 300 ml of styrene. A solution of 1200 mg of (C$_5$Me$_5$)$_2$Sm(THF)$_2$ in 30 ml of THF was added rapidly with vigorous stirring at −10° C. A temperature rise to +43.5° C. was observed. The polymerization was terminated 30 minutes after the samarocene addition by addition of 1.2 ml of a methanol/acetic acid mixture (1/1) and 3.6 mg of 4-tert-butylpyrocatechol.

Example 14

Block copolymerization of 2-ethylhexyl acrylate with methyl methacrylate at 0° C.

4 ml of MMA and 2 ml of ERA, mixed dropwise with 0.03 ml of a 1.9 M AlEt$_3$ solution (in toluene), were added to 25 ml of styrene. The mixture was cooled to 0° C. and immediately mixed, with vigorous stirring, with a solution of 111 mg of (C$_5$Me$_5$)$_2$Sm(THF)$_2$ in 5 ml of THF. The temperature increased to 38° C. After 6 min, the polymerization was terminated by adding 1 ml of a methanol/acetic acid mixture (10/1). M$_n$=69900 g/mol; M$_w$/M$_n$=1.37.

Example 15 (Comparative Example)

Block copolymerization of 2-ethylhexyl acrylate with methyl methacrylate at −20° C. in tetrahydrofuran 80 ml of MMA and 40 ml of EHA, mixed dropwise with 0.6 ml of a 1.9 M AlEt$_3$ solution (in toluene) were added to 500 ml of THF in a 2 l multinecked flask with stirrer. The mixture was cooled to −20° C. and immediately mixed, with vigorous stirring, with a solution of 1.52 g of (C$_5$Me$_5$)$_2$Sm(THF)$_2$ in 40 ml of THF. The temperature increased to 30° C. The mixture was highly viscous and after 15 min had a gel-like consistency and could no longer be stirred.

The polymerization was terminated by adding 20 ml of a methanol/acetic acid mixture (10/1). After precipitating the polymer in 8 l of methanol with 150 ml of 2 N HCl, washing with methanol and drying at 60° C. under reduced pressure, 111 g of white powder were isolated (100% yield). M$_n$=132800 g/mol; M$_w$/M$_n$1.56.

Further details regarding the rubbers prepared in the examples can be seen from Table 1.

TABLE 1

| Ex. | Comonomer [a] [% by weight] | M$_w$[b] | M$_w$/M$_n$[b] |
|---|---|---|---|
| 1 | — | 35500 | 2.8 |
| 2 | 10 DCPA | 218900 | 2.2 |
| 3 | — | 130000 | 1.4 |
| 4 | — | 122000 | 2.8 |
| 5 | — | 275300 | 1.5 |
| 6 | 5 AMA | 105000 | 1.6 |
| 7 | 10 DCPA | 393300 | 1.6 |
| 8 | 10 AMA | 313700 | 1.5 |
| 9 | 6.6 AOEA | 305000 | 1.4 |
| 10 | 7.5 DCPA | 361500 | 1.7 |
| 11 | 10 DCPA/30 LA | 487000 | 2.4 |
| 12 | 67 MMA | 70409 | 1.3 |
| 13 | 50 MMA | 97100 | 1.3 |
| 14 | 67 MMA | 69900 | 1.3 |

[a]AMA: allyl methacrylate, DCPA: dihydrodicyclopentadienyl acrylate, AOEA: 2-allyloxyethyl acrylate, LA: lauryl acrylate, MMA: methyl methacrylate
[b]determined by means of gel permeation chromatography using a poly(methyl methacrylate) standard

C. Preparation of impact-modified molding compositions

General Procedure

The thermoplastic molding compositions and the block copolymers. were extruded at a kneader temperature of 250° C. and with a kneading time of 8 min. The ground extrudate was converted into test articles by means of injection molding. Closer details of the composition of the molding compositions and block copolymers used and of the properties of the test articles obtained can be seen from Tables 2 and 3.

TABLE 2

Components for the preparation of impact-modified molding compositions and their composition

| Ex. | Thermoplast. molding composition[a] | Matrix[b] (% by weight) | M$_n$ (g/mol)[c] / D | Poly (MMA-b-EHA-B-MMA)[a,d] M$_n$ (g/mol) / D | EHA content (% by weight) | Modifier (% by weight)[e] |
|---|---|---|---|---|---|---|
| 16 | SAN with 19% by weight of AN | 70 | 64000 / 2.5 | 220000 / 1.5 | 62 | 30 |
| 17 | SAN with 25% by weight of AN | 70 | 78500 / 2.0 | " | " | 30 |
| 18 | SAN with 35% by weight of AN | 70 | 66500 / 2.3 | " | " | 30 |
| 19 | SAN with 19% by weight of AN | 70 | 64000 / 2.5 | 77000 / 1.8 | 52 | 30 |

[a]SAN: styrene-acrylonitrile copolymer, AN: acrylonitrile, EHA: 2-ethylhexyl acrylate, MMA: methyl methacrylate
[b]Content of the SAN molding composition in the impact-modified molding composition
[c]Determined by means of gel permeation chromatography on a polymethyl methacrylate standard TABLE 2-continued Components for the preparation of impact-modified molding compositions and their composition

| Thermoplast. molding Ex. composition[a] | Matrix[b] | | Poly (MMA-b-EHA-B-MMA)[a), d] | | Modifier |
|---|---|---|---|---|---|
| | (% by weight) | $M_n$ (g/mol)[c] / D | $M_n$ (g/mol) / D | EHA content (% by weight) | (% by weight)[e] |

[d]Prepared similarly to Example 13
[e]Content of the block copolymer in the impact-modified molding composition

TABLE 3

Mechanical properties of the impact-modified molding compositions

| Ex. | Test article according to example | Impact strength (kJm$^{-2}$) [a] at | |
|---|---|---|---|
| | | −30° C. | −40° C. |
| 20 | 16 | 28 | 25 |
| 21 | 17 | 29 | 26 |
| 22 | 18 | 23 | 22 |
| 23 | 19 | 20 | — |

[a]Determined as specified in DIN 53453 according to Edition 5/75

What is claimed is:

1. A process for the preparation of a homopolymer a copolymer or a block copolymer which (co)polymer comprises acrylates or methacrylates or acrylates and methacrylates as monomer units, by anionic polymerization in the presence of a solvent, wherein the solvent comprises one or more olefinically unsaturated compounds of formula (I)

$$(R^a)(R^b)C=C'(R^c)(R^d) \quad (I)$$

wherein

R$^a$ and R$^b$ are independently of one another selected from the group of hydrogen, unsubstituted and substituted, straight-chain and branched, C$_1$–C$_{14}$-alkyl unsubstituted and singly- and multiply substituted C$_1$–C$_{14}$-aryl, unsubstituted and substituted C$_3$–C$_7$-cycloalkyl and C$_2$–C$_{10}$-alkenyl, R$^c$ and R$^d$ are independently of one another selected from the group of hydrogen, unsubstituted and substituted, straight-chain and branched, C$_1$–C$_{14}$-alkyl, unsubstituted and singly- and multiply substituted C$_6$–C$_{14}$-aryl, unsubstituted and substituted C$_3$–C$_7$-cycloalkyl and C$_2$–C$_{10}$-alkenyl, or R$^c$ and R$^d$ are together with C' unsubstituted or singly- or multiply-substituted cyclopropyl, cyclopentyl or cyclohexyl in an amount which is effective to suppress gel formation of the reaction mixture.

2. The process of claim 1, wherein one of the compounds of formula (I) is a vinylaromatic compound.

3. The process of claim 1, wherein the solvent further comprises an inert, aprotic, polar or non-polar co-solvent.

4. The process of claim 1, wherein the solvent further comprises dimethoxyethane, diethyl ether, tetrahydrofuran, toluene, ethylbenzene or cyclohexane or any desired mixture thereof as a co-solvent.

5. The process of claim 1, wherein the solvent comprises the compound of formula (I) in a proportion of from 5 to 99% by volume.

6. The process of claim 1, wherein the compound of formula (I) is styrene or singly or multiply ring-substituted styrene.

7. The process of claim 1, wherein the acrylates and/or methacrylates are selected from the group of (meth)acrylates of methyl, ethyl, n-propyl, isopropyl, n-butyl, isobutyl, tert-butyl, allyl, cyclohexyl, dihydrodicyclopentadienyl, 2-allyloxyethyl, 3- and 4-vinylbenzyl and 2-ethylhexyl (meth)acrylate and a mixture thereof.

8. The process of claim 1, which process is carried out continuously.

9. The process of claim 1, wherein the anionic polymerization is carried out in the presence of an initiator system consisting of an alkaline earth metal alkyl compound or an alkali metal alkyl compound and a metal alkoxide.

10. The process of claim 1, wherein the anionic polymerization is carried out in the presence of a metallocene initiator.

11. An impact-modified thermoplastic molding composition comprising, as a blend component, a block copolymer obtainable by the process of claim 1.

12. A fiber, a film or a shaped article comprising the impact-modified thermoplastic molding composition defined in claim 11.

13. The process of claim 1, wherein

R$^a$ and R$^b$ are independently of one another selected from the group consisting of hydrogen, methyl, ethyl, isopropyl, n-propyl, isobutyl, n-butyl, tert-butyl, phenyl, tolyl, cyclopropyl, cyclopentyl, cyclohexyl, vinyl, allyl, butenyl and butadienyl, and R$^c$ and R$^d$ are independently of one another selected from the group consisting of hydrogen, methyl, ethyl, isopropyl, n-propyl, isobutyl, n-butyl, tert-butyl, phenyl, tolyl, cyclopropyl, cyclopentyl, cyclohexyl, vinyl, allyl, butenyl and butadienyl, or R$^c$ and R$^d$ form together with C' an unsubstituted or singly- or multiply-substituted cyclopropyl, cyclopentyl or cyclohexyl group.

14. The process of claim 1, wherein one or more of the compounds of formula (I) are selected from the group consisting of ethylene, propylene, 1-butene, 2-butene, butadiene, 1,4-hexadien, 1,5-hexadiene, 1-octene, cyclopentene, cyclohexene, cyclopropylidene, cyclopentylidene and fulvene.

15. The process of claim 1, wherein the homopolymer, the copolymer or the block copolymer which is prepared consists essentially of acrylates and/or methacrylates as monomer units.

16. The process of claim 2, wherein one or more of the compounds of formula (I) are selected from the group consisting of ethylene, propylene, 1-butene, 2-butene, butadiene, 1,4-hexadien, 1,5-hexadiene, 1-octene, cyclopentene, cyclohexene, cyclopropylidene, cyclopentylidene and fulvene.

* * * * *

UNITED STATES PATENT AND TRADEMARK OFFICE
CERTIFICATE OF CORRECTION

PATENT NO. : 6,262,213 B1
DATED : July 17, 2001
INVENTOR(S) : Juengling et al.

It is certified that error appears in the above-identified patent and that said Letters Patent is hereby corrected as shown below:

Column 15,
Line 40, "$C_1$-$C_{14}$-" should be -- $C_6$-$C_{14}$- --.

Signed and Sealed this

Twenty-sixth Day of July, 2005

JON W. DUDAS
*Director of the United States Patent and Trademark Office*